United States Patent [19]
Fulton

[11] Patent Number: 5,242,163
[45] Date of Patent: Sep. 7, 1993

[54] CASINO GAME SYSTEM
[75] Inventor: Stanley E. Fulton, Las Vegas, Nev.
[73] Assignee: D.D. Stud Inc., Las Vegas, Nev.
[21] Appl. No.: 936,567
[22] Filed: Aug. 27, 1992
[51] Int. Cl.[5] ............................................. A63F 3/06
[52] U.S. Cl. ................................ 273/85 CP; 273/269;
273/138 A; 273/237; 364/410
[58] Field of Search ............ 273/85 CP, 85 G, 138 A,
273/237, 269, 238, DIG. 28; 364/410, 411, 412

[56] References Cited
U.S. PATENT DOCUMENTS

| | | | |
|---|---|---|---|
| 4,378,940 | 4/1983 | Gluz et al. | 273/237 |
| 4,455,025 | 6/1984 | Itkis | 273/237 |
| 4,467,424 | 8/1984 | Hedges et al. | 364/412 |
| 4,636,951 | 1/1987 | Harlick | 273/DIG. 28 X |
| 4,856,787 | 8/1989 | Itkis | 273/237 |
| 4,909,516 | 3/1990 | Kolinsky | 273/237 |
| 4,964,638 | 10/1990 | Ishida | 273/138 A |
| 5,007,649 | 4/1991 | Richardson | 273/237 |
| 5,054,787 | 10/1991 | Richardson | 273/138 A |

Primary Examiner—V. Millin
Assistant Examiner—Sebastiano Passaniti
Attorney, Agent, or Firm—Daniel P. Burke

[57] ABSTRACT

A casino game system which allows a person playing a first gaming device, such as a video gaming device, to play a conventional group oriented game. e.g. bingo, without leaving the first gaming device. One embodiment comprises a casino bingo game comprising a plurality of gaming devices which each allow a player to play a first game, such as stud poker. Each of the gaming devices has at least one means for generating sound corresponding to the play of the first game. A control station is placed in communication with the gaming devices. The sound generating means of the plurality of gaming devices is responsive to the control station such that the volume of the sound corresponding to the first game can be reduced at the beginning of a bingo session, in response to a signal from the control station. The control station is also capable of generating a first signal which can be detected at the gaming devices to indicate the beginning of the bingo session. If the person does not wish to play bingo, he can continue to play the first game. Alternatively, a person can access a bingo playing surface which is on a bingo card movably attached to the gaming device. The volume of sound emanating from the sound generating means is also reduced on those gaming devices where a player has not accessed the playing surface and has not elected to play bingo so that the distractions to other players who do elect to play bingo will be minimized.

27 Claims, 3 Drawing Sheets

CASINO GAME SYSTEM

The present invention is directed to a casino game, and more particularly, to a casino game that allows gaming device players to participate in organized group-oriented games, such as bingo, without ever leaving the gaming device.

BACKGROUND OF THE INVENTION

Bingo is a fun game enjoyed by people of all ages every year. It typically provides excitement by mixing chance with a requirement that players concentrate on numbers being announced by a caller.

Bingo is such an enjoyable game that gambling casinos have set up bingo games in recent years as an added attraction for their players. Conventional bingo games have been set up in casinos in areas adjacent to other areas of the casinos which have card games, gaming devices, roulette, etc. With such arrangements, when a player has desired to play bingo, he has had to leave the other game that he is playing and go to the bingo area. One distinct advantage gained by conducting the bingo game in an area separate from the other games is that the players will be able to hear the numbers announced by the caller. Casinos, especially those areas of the casino that have the gaming devices, are generally quite noisy. Thus the gaming device areas are generally unsuitable for playing bingo in a conventional fashion where the player must hear the caller and mark his bingo card in response to the announcements.

On the other hand, upon finishing the bingo game, that player may or may not return to the game that he was previously playing. Those familiar with the gaming industry will appreciate that it is in the best interest of the casino if the player resumes play of the game that he had been playing. It will thus be appreciated that having bingo games conducted in separate areas of a casino has disadvantages.

It would, therefore, be desirable to provide a casino bingo game that permits a person playing a gaming device to participate in a group bingo game without being interrupted by loud noises from his gaming device or other gaming devices in the area. While other electronic bingo games have been proposed, none of the previously disclosed bingo games offer the advantages of the present invention as described below.

SUMMARY OF THE INVENTION

The present invention overcomes disadvantages of previously known gaming devices by providing a casino gaming system which allows a person playing a first gaming device, such as a video gaming device, to play a conventional group-oriented game, e.g. bingo, without leaving the first gaming device.

One embodiment of the present invention comprises a casino bingo game comprising a plurality of gaming devices which each allow a player to play a first game, such as stud poker. Each of the gaming devices has at least one means for generating sound, such as a speaker, corresponding to the play of said first game. A control station is placed in communication with the gaming devices through wires or some other conventional manner. The control station is capable of generating a first signal which can be detected at the gaming devices to indicate the beginning of a bingo session. If the person does not wish to play bingo, he can continue to play the first game. If, however, he does wish to participate in the bingo game, he can access a bingo playing surface which, in this embodiment, is on a bingo card movably attached to the gaming device. The sound generating means of said plurality of gaming devices is responsive to the control station such that the volume of the sound corresponding to said first game can be reduced at the beginning of a bingo session, in response to a signal from said control station. According to one preferred embodiment of the present invention, the volume of sound emanating from the sound generating means is also reduced on those gaming devices where a player has not accessed said playing surface and has not elected to play bingo so that the distractions to other players who do elect to play bingo will be minimized.

According to another embodiment of the present invention, the second game is not bingo but is some other group-oriented game.

According to still another embodiment, the bingo playing surface appears on the screen of the gaming device which is a video gaming device. These and other embodiments are described below.

The present invention, thereby, overcomes the disadvantages of the prior art by providing a casino game system which allows a gaming device player to play a group-oriented game while minimizing the audible distractions emanating from gaming devices whose players are not participating in the group-oriented game.

DETAILED DESCRIPTION

The present invention provides a casino game system adapted to allow the playing of at least two different games, one of which is preferably a game adapted to be played by an individual and at least one other game is oriented to be played by a group of players. The system is designed to allow the play of a first game at a plurality of separate game devices, e.g. video gaming devices. Until the beginning of a second game, the players at the gaming devices can play the first game without interruption in a manner well known in the gaming industry.

The gaming devices of the present invention are provided with sound generating devices, such as audio speakers, in order to enhance the enjoyability of the games played on the gaming devices. For example, the first game may be a form of video poker. Those skilled in the art will appreciate that video poker games are typically provided with sound effects during the course of the game. For example, electronic tones, sirens, bells and other noises are commonly used to indicate that a wager has been placed, option selection, reels spinning, hitting a jackpot, as well as various other degrees of success by the players. Thus, before the commencement of the second game, the sounds normally generated in association with the first game will be generated without interruption.

The gaming system of the present invention also comprises a control station which is in communication with the individual gaming devices. One function of the control station is to reduce the volume of the sound associated with the first game at the beginning of the second game. By reducing the volume of the sound associated with the first game, the distractions to people playing the second game can be minimized. Another optional function of the control station is to relay information relevant to the play of the second game to the players wishing to play the second game. For example, the control station may also be used to broadcast numbers by a caller when the second game is a form of bingo.

Figure 1:
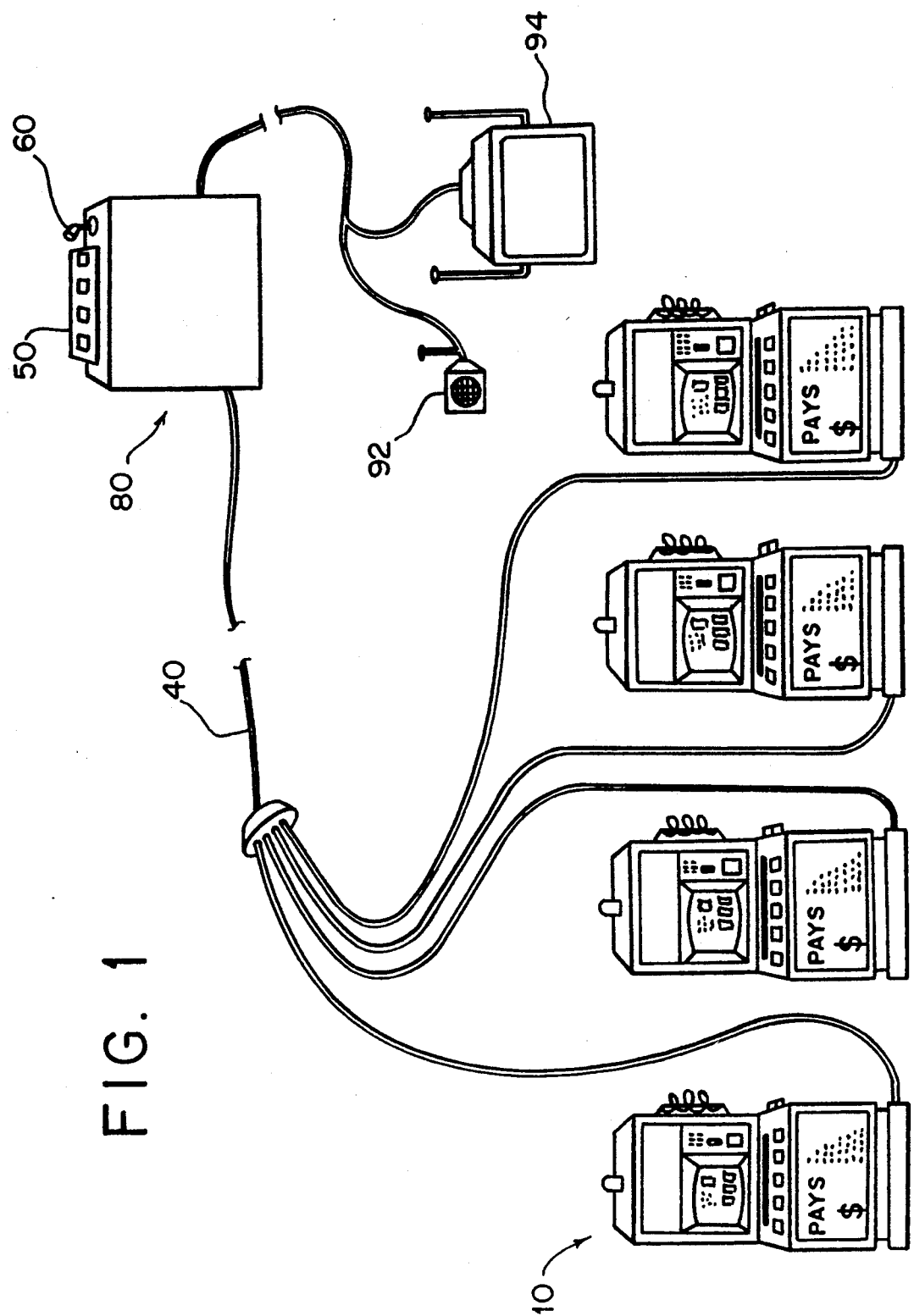
FIG. 1 is a schematic diagram of one embodiment of the present invention.

One embodiment of the present invention is illustrated in FIG. 1 which shows a plurality of gaming devices 10 in the form of video gaming devices connected by electrical wires 40 to a control station 80. As used herein, the term "gaming devices" includes the devices commonly used in the gaming industry including video poker games, slot machines and other types of video games. The term "video gaming devices" is used herein to include any form of gaming device which utilizes at least one video screen. With the exceptions of the modifications explained herein, the gaming devices 10 may be conventional gaming devices as are commonly used or may hereafter be developed for use in the gaming industry. Such gaming devices typically comprise a display window 12, a button ledge 14, a coin slot 16, a coin payout trough 18, a coin payout chute 20, a speaker 22, a flashable light 24, a payout schedule 26, and instructions on the play of the game 28. Gaming devices 10 may all be configured to allow the play of games as has been previously suggested including the play of a single game, the play of different games at different gaming devices, the play of a plurality of games at each of the gaming devices, or the coordinated play of a single game by a group of the gaming devices.

Unlike previously known gaming devices, the present invention also comprises a playing surface for a second game which is readily accessible to the player of the first game. According to this embodiment of the present invention, a card 30 is movably attached to gaming device 10 with a length of thin cable 32 such that the card 30 will normally be suspended from the machine within easy reach of the player. The cable 32 is advantageously long enough to allow a player to move the card to the front of the gaming device 10 when the player desires to play the second game. According to this embodiment of the present invention, the bingo card 30 is most preferably permanently and movably attached to the gaming device 10.

The control station 80 of this embodiment of the present invention is designed to be operated by a person hereinafter referred to as the station operator. When the station operator is not at the control station, gaming devices 10 may operate independently or may be linked to permit the play of one or more games, independently or between players and/or a dealer as has been previously suggested. The play of such games, herein referred to as a first game, is permitted to proceed without interruption until the station operator provides a signal to the players at the gaming devices that it is time to start a session of the second group-oriented game, which according to this illustrated embodiment is a form of bingo.

Each gaming device of the casino game system of the present invention is in communication with the control station 80. According to the illustrated embodiment, the communication between the control station 80 and each gaming device 10 is established through electrical wires 40. Those skilled in the art will appreciate that this communication may readily be accomplished in some other manner, such as with other known transmitters and receivers, e.g. radio, as described below with reference to FIG. 3, without departing from the scope of the present invention.

When a session of the second game is about to begin, a signal is sent from the control station. The signal from the station operator can take any form that is sensible at the gaming devices. For example, the station operator may simply push a button 52 on a keypad 50 to send a signal through electrical wires 40 to gaming devices 10 where an audible or visible signal is provided to the players to indicate that a bingo session is about to begin. Such a signal could include a flashing message on a portion of the display window 12. Alternatively, the signal may be provided through some device which is external to gaming devices 10 but which is in proximity to gaming devices 10, such as a ceiling mounted speaker 92. The signal may also simply take the form of a voice announcement by the station operator broadcast from microphone 60 through speakers 22. In any event, the players are informed that a session of a second game is about to begin and that they have the option of participating in the second game.

In recognition of the fact that the areas of casinos which have gaming devices are typically very noisy, the present invention advantageously provides the station operator with a way of reducing the volume of sound emanating from gaming devices 10. The volume of sound is reduced, preferably to the point of elimination, either at the beginning of the second game session or, more preferably, just before the station operator sends the signal to indicate that the session of the second game is about to begin. In this manner, the persons desiring to play the second game will be able to get ready to play by accessing the needed playing surface on card 30 and will then be able to hear the various instructions and calls from the station operator before and during the play of the second game.

Figure 2:
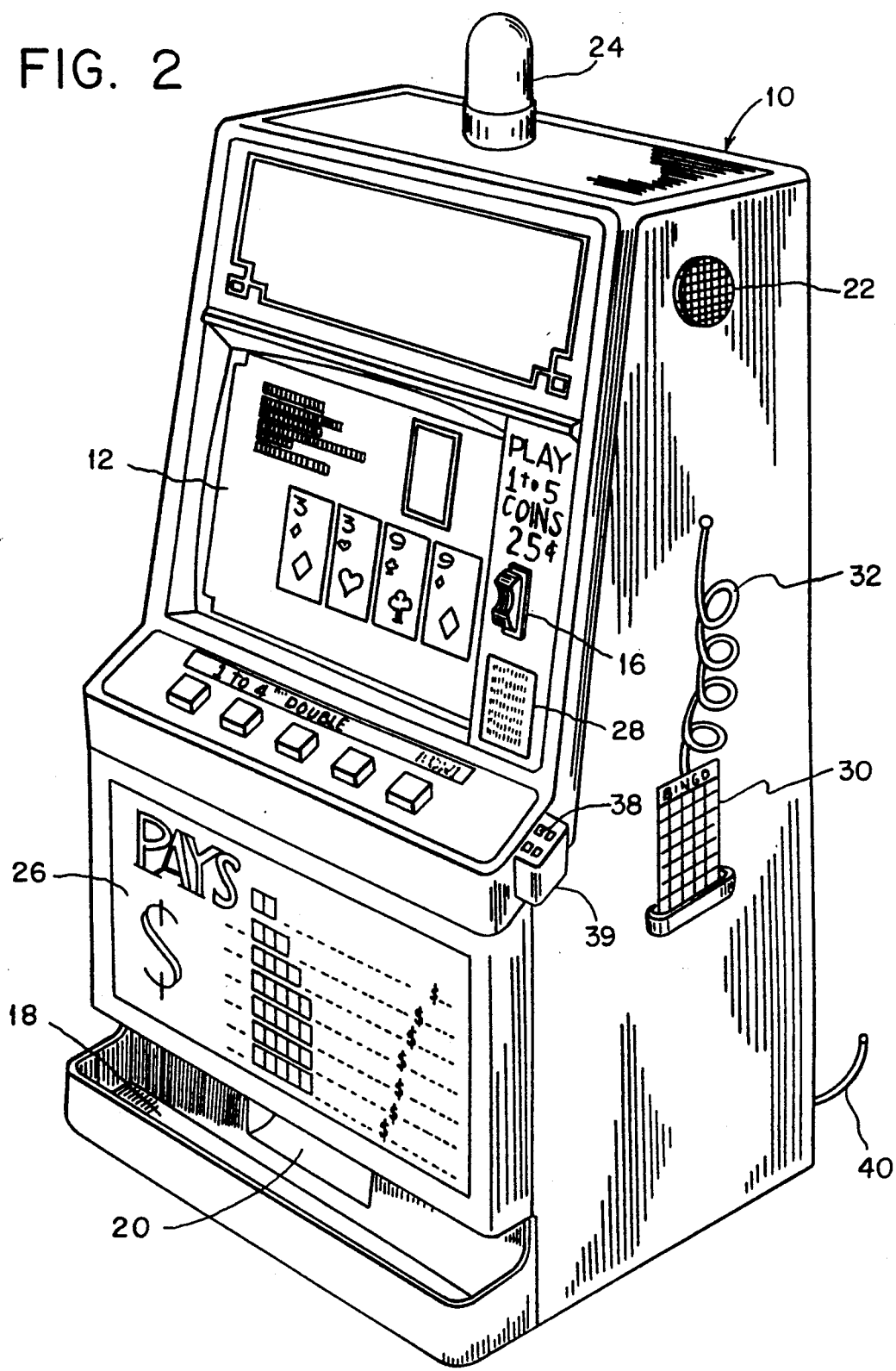
FIG. 2 is a perspective view of a gaming device used in the embodiment shown in FIG. 1.

Thus in accordance with this preferred embodiment of the present invention wherein the second game is a form of bingo, at the desired time, the station operator first reduces the volume associated with the first game or games which are then being played or which may be activated during the second game session. The station operator then provides a sensible signal to the players that a bingo session is about to begin. After providing the players with enough time to access the playing surface 35 on card 30, the station operator provides any desired instructions and then begins the bingo game by drawing numbers and announcing the drawn numbers to the players. Using playing surface 35 of card 30 and markers 38 which are conveniently provided in a marker tray 39 to mark their cards, the players can then follow along with the station operator and play the game in conventional manner without noisy interruptions from surrounding gaming devices 10 and, importantly, without ever leaving gaming device 10. The top playing surface 35 of card 30 is best shown in FIG. 2 which is in the form of a conventional bingo card. According to another embodiment of the present invention, the reverse side of card 30 is a playing surface for another game. When the second game session is over, the players are in a natural position to simply resume play of the first game.

In addition to providing players of the second game with audible signals, instructions and announcements during the play of the second game, the embodiment of the present invention shown in FIG. 1 also provides the station controller with the option of showing the drawing of numbers "live" on a video screen 94. This option is intended to provide greater excitement and enjoyability for those participating in the bingo game, and will also serve as a device for informing other people in the casino of the option of playing bingo at gaming devices 10.

Figure 3:
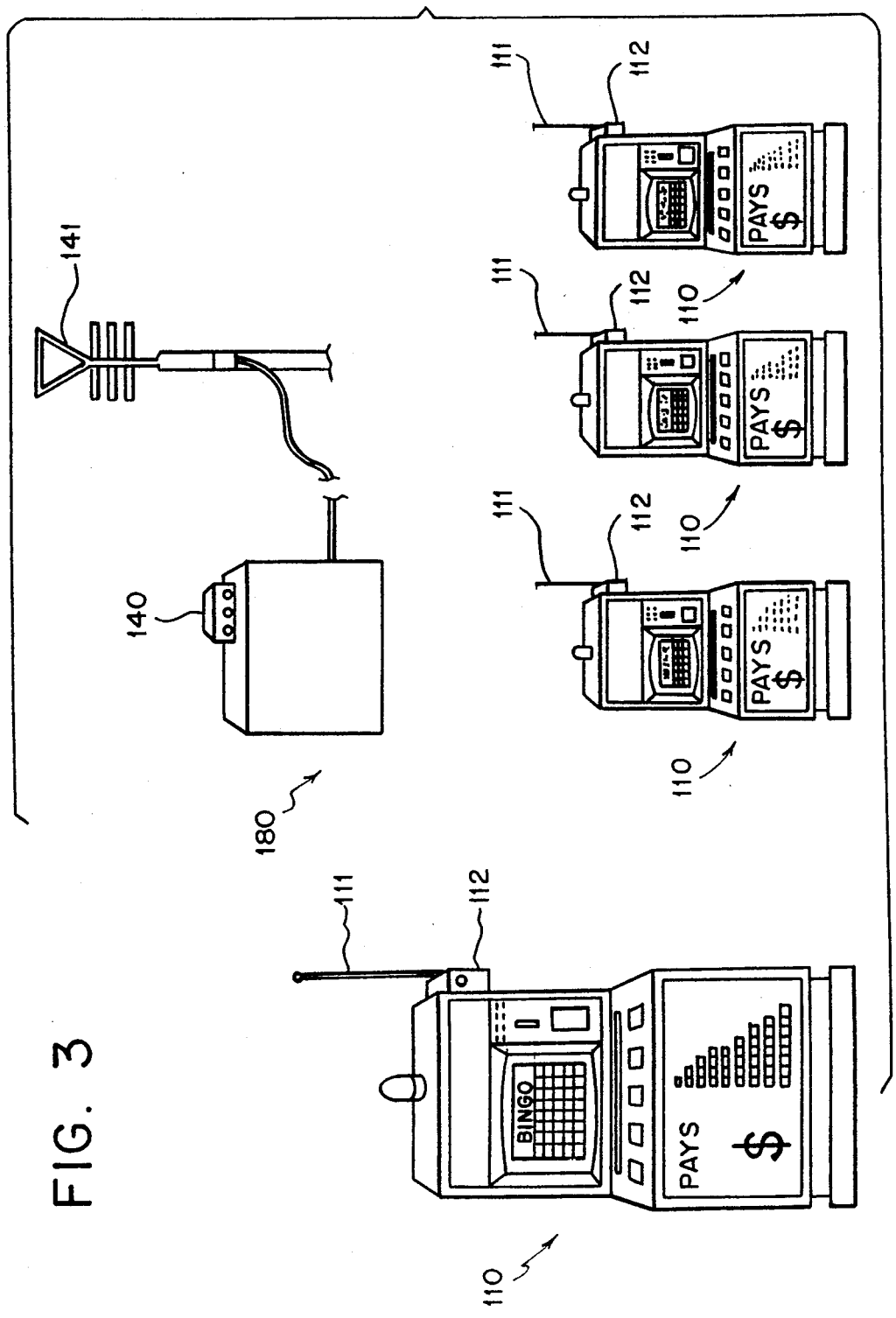
FIG. 3 is a schematic diagram of an alternative embodiment of the present invention.

According to an alternative embodiment of the present invention shown in FIG. 3, the communication between control station 180 and gaming devices 110 is achieved with a radio controller 140 having an antenna 141 which is connected to control station 180. The radio controller 140 is in radio communication with a complementary radio controller 112 having an antenna 111 at gaming devices 110 and is thereby capable of sending and receiving radio signals to gaming devices 110. Though the illustrated embodiment shows each of gaming devices 110 being provided with a radio receiver 112, those skilled in the art will appreciate that other configurations, such as providing only a single radio receiver to which each of the gaming devices are connected, would also be suitable. Using signals other than radio signals would also be within the ability of those skilled in the art without departing from the scope of the present invention.

The embodiment shown in FIG. 3 also provides a playing surface for the second game on the video screen. The marking of boxes on the playing surface of this embodiment can be accomplished by using a touch sensitive screen or the boxes on the playing surface can be marked automatically in response to signals generated by the station operator.

While the previously described embodiments are intended to utilize people to run the control stations, according to still another embodiment of the present invention, the casino gaming system is configured to operate automatically. According to this embodiment, the control station comprises a timing circuit, a random number generator which randomly selects numbers for the second game, and a voice generating system for vocalizing the random numbers generated. This embodiment could essentially run the second game without human intervention by conducting sessions of the second game at either predetermined intervals or at some other times.

According to the preferred embodiments of the present invention described above, the players desiring to participate in the second game session are not required to pay any additional money to do so. In this manner, the play of the second game is provided to the casino patrons as a promotional device. Accordingly, the casino gaming system can be configured to only allow people who were already playing a first game on a gaming device 10 to participate in the second game. People attending the casino who enjoy bingo will then have an additional incentive to play the first game. Of course, it is within the scope of the present invention, and well within the skill of those skilled in the art, to require input of some monetary value, either in the form of coins or credits, before allowing players to participate in the second game.

While embodiments of the present invention comprise a second game comprising bingo, the actual form of bingo can be any type of bingo known in the art which includes interaction between a control station and the players.

I claim:

1. A casino bingo game comprising:
   a plurality of gaming devices, each of said gaming devices adapted to allow a player to play a first game, wherein said first game is a game other than bingo;
   said gaming devices comprising means for generating sound corresponding to the play of said first game;
   a control station in communication with said gaming devices and comprising means for producing a signal operative to produce a first signal sensible at said gaming devices to indicate the beginning of a bingo session;
   at least one playing surface associated with said gaming device and resembling a bingo card, wherein said playing surface is selectively accessible by a player wishing to participate in said bingo session thereby providing a player playing said first game with the option of participating in said bingo session;
   said sound generating means of said plurality of gaming devices responsive to said control station whereby the volume of the sound corresponding to said first game is noticeably reduced at the beginning of a bingo session, in response to a signal from said control station, even if a player has not accessed said playing surface and has not elected to play bingo.

2. A casino bingo game according to claim 1 wherein said playing surface is on a bingo card movably attached to said gaming device.

3. A casino bingo game according to claim 1 wherein said playing surface is displayed on said video screen in response to a player pushing a button on said gaming device.

4. A casino bingo game according to claim 1 wherein said first signal comprises a live voice message.

5. A casino bingo game according to claim 1 wherein said first signal comprises an electronic voice message.

6. A casino bingo game according to claim 1 wherein said first signal is visible.

7. A casino bingo game according to claim 1 wherein said sound corresponding to said first game is eliminated at the beginning of a bingo session.

8. A casino bingo game according to claim 1 wherein said sound generating means comprises an audio speaker.

9. A casino bingo game according to claim 1 wherein said control station comprises a microphone and a keypad.

10. A casino bingo game according to claim 1 wherein said first game is a form of poker.

11. A casino bingo game according to claim 1 wherein said first game provides a player with an opportunity to increase his wager even after the player has received an indication of success.

12. A casino bingo game according to claim 1 wherein said gaming device further comprises means for receiving monetary value and wherein said gaming device does not require input of monetary value by a player in order to allow said playing surface to be accessed.

13. A casino game comprising:
   a plurality of gaming devices, each of said gaming devices adapted to allow a player to play a first game and a second game, wherein said second game is played by a plurality of players and requires input from a control station, and said first game can be played independently of said control station;

said gaming devices comprising means for generating sound corresponding to the play of said first game;

a control station in communication with said gaming devices and comprising means for producing a signal operative to produce a first signal sensible at said gaming devices to indicate the beginning of a session of said second game;

at least one playing surface associated with said gaming device wherein said playing surface is an integral part of said second game and is selectively accessible by a player wishing to participate in said second game session thereby providing a player playing said first game with the option of participating in said second game session;

said sound generating means of at least one of said plurality of gaming devices responsive to said control station whereby the volume of the sound corresponding to said first game is noticeably reduced at the beginning of a second game session, in response to a signal from said control station.

14. A casino game according to claim 13 wherein the volume of sound corresponding to said first game and emanating from said sound generating means of gaming devices at which players have accessed said playing surfaces is noticeably reduced in response to a signal from said control station.

15. A casino game according to claim 13 wherein the volume of sound corresponding to said first game and emanating from said sound generating means of said gaming devices is noticeably reduced in response to a signal from said control station even if a player has not accessed said playing surface and has not elected to play said second game.

16. A casino game according to claim 13 wherein said second game comprises bingo.

17. A casino bingo game according to claim 13 wherein said playing surface is a bingo card movably attached to said gaming device.

18. A casino bingo game according to claim 13 wherein said playing surface is displayed on said video screen in response to a player pushing a button on said gaming device.

19. A casino bingo game according to claim 13 wherein said first signal comprises a live voice message.

20. A casino bingo game according to claim 13 wherein said first signal comprises an electronic voice message.

21. A casino bingo game according to claim 13 wherein said first signal is visible.

22. A casino bingo game according to claim 13 wherein said sound corresponding to said first game is eliminated at the beginning of a bingo session.

23. A casino bingo game according to claim 13 wherein said sound generating means comprises an audio speaker.

24. A casino bingo game according to claim 13 wherein said control station comprises a microphone and a keypad.

25. A casino bingo game according to claim 13 wherein said first game is a form of poker.

26. A casino bingo game according to claim 13 wherein said first game provides a player with an opportunity to increase his wager even after the player has received an indication of success.

27. A casino bingo game comprising:

a plurality of gaming devices, each of said gaming devices adapted to allow a player to play a first game, wherein said first game is a game other than bingo;

a control station in communication with said gaming devices and comprising means for producing a signal operative to produce a first signal sensible at said gaming devices to indicate the beginning of a bingo session; and at least one playing surface associated with said gaming device and disposed on a bingo card, wherein said playing surface is selectively accessible by a player wishing to participate in said bingo session thereby providing a player playing said first game with the option of participating in said bingo session;

wherein said bingo card is movably connected to said gaming device.

* * * * *